US010153495B2

(12) United States Patent
Tsuchida et al.

(10) Patent No.: US 10,153,495 B2
(45) Date of Patent: Dec. 11, 2018

(54) METHOD FOR PRODUCING CORE-SHELL CATALYST

(71) Applicant: Panasonic Corporation, Osaka (JP)

(72) Inventors: Shuzo Tsuchida, Nara (JP); Yasushi Taniguchi, Osaka (JP); Ryouhei Seki, Osaka (JP); Yasuhiro Ueyama, Hyogo (JP); Hideyuki Takahashi, Miyagi (JP); Shun Yokoyama, Miyagi (JP); Kazuyuki Tohji, Miyagi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/424,195

(22) Filed: Feb. 3, 2017

(65) Prior Publication Data

US 2017/0244111 A1 Aug. 24, 2017

(30) Foreign Application Priority Data

Feb. 18, 2016 (JP) .................................. 2016-029288

(51) Int. Cl.
*H01M 4/86* (2006.01)
*H01M 4/92* (2006.01)
(Continued)

(52) U.S. Cl.
CPC ......... *H01M 4/921* (2013.01); *H01M 4/8657* (2013.01); *H01M 4/885* (2013.01); *H01M 4/926* (2013.01); *H01M 2008/1095* (2013.01)

(58) Field of Classification Search
CPC ....... H01M 2008/1095; H01M 4/8657; H01M 4/92; H01M 4/921; H01M 4/926
See application file for complete search history.

(56) References Cited

U.S. PATENT DOCUMENTS

2008/0280753 A1* 11/2008 Watanabe ............ B01J 23/8906
502/101
2009/0192030 A1 7/2009 Myers et al.
(Continued)

FOREIGN PATENT DOCUMENTS

EP 2959968 A1 12/2015
JP 2010-092725 4/2010
(Continued)

OTHER PUBLICATIONS

The Extended European Search Report dated May 4, 2017 for the related European Patent Application No. 17153404.3.

*Primary Examiner* — Jun Li
(74) *Attorney, Agent, or Firm* — Panasonic IP Management; Kerry S. Culpepper

(57) ABSTRACT

Provided is a method for producing a catalyst, including: (i) mixing a core metal salt that serves as a material for a core metal, and a complexing agent (a) to produce a core metal complex solution containing a core metal complex; (ii) mixing a shell metal salt that serves as a material for a shell metal, and a complexing agent (b) to produce a shell metal complex solution containing a shell metal complex; (iii) mixing a carbon powder and a dispersing agent to produce a carbon powder dispersion; (iv) mixing the core metal complex solution, the shell metal complex solution, and the carbon powder dispersion, and reducing the core metal complex and the shell metal complex on the carbon powder by using at least one reducing agent; and (v) drying and baking at a predetermined temperature the carbon powder resulting from Step (iv), said carbon powder having a core-shell structure that includes the core metal and the shell metal.

7 Claims, 5 Drawing Sheets

(51) Int. Cl.
  *H01M 4/88*     (2006.01)
  *H01M 8/1018*   (2016.01)

(56) References Cited

U.S. PATENT DOCUMENTS

2010/0092841 A1* 4/2010 Lopez .................. B22F 1/0018
                                               429/409
2013/0324394 A1* 12/2013 Shao ....................... B01J 37/06
                                               502/339

FOREIGN PATENT DOCUMENTS

| JP | 2012-157833   | 8/2012 |
| JP | 2014-108380 A | 6/2014 |

* cited by examiner

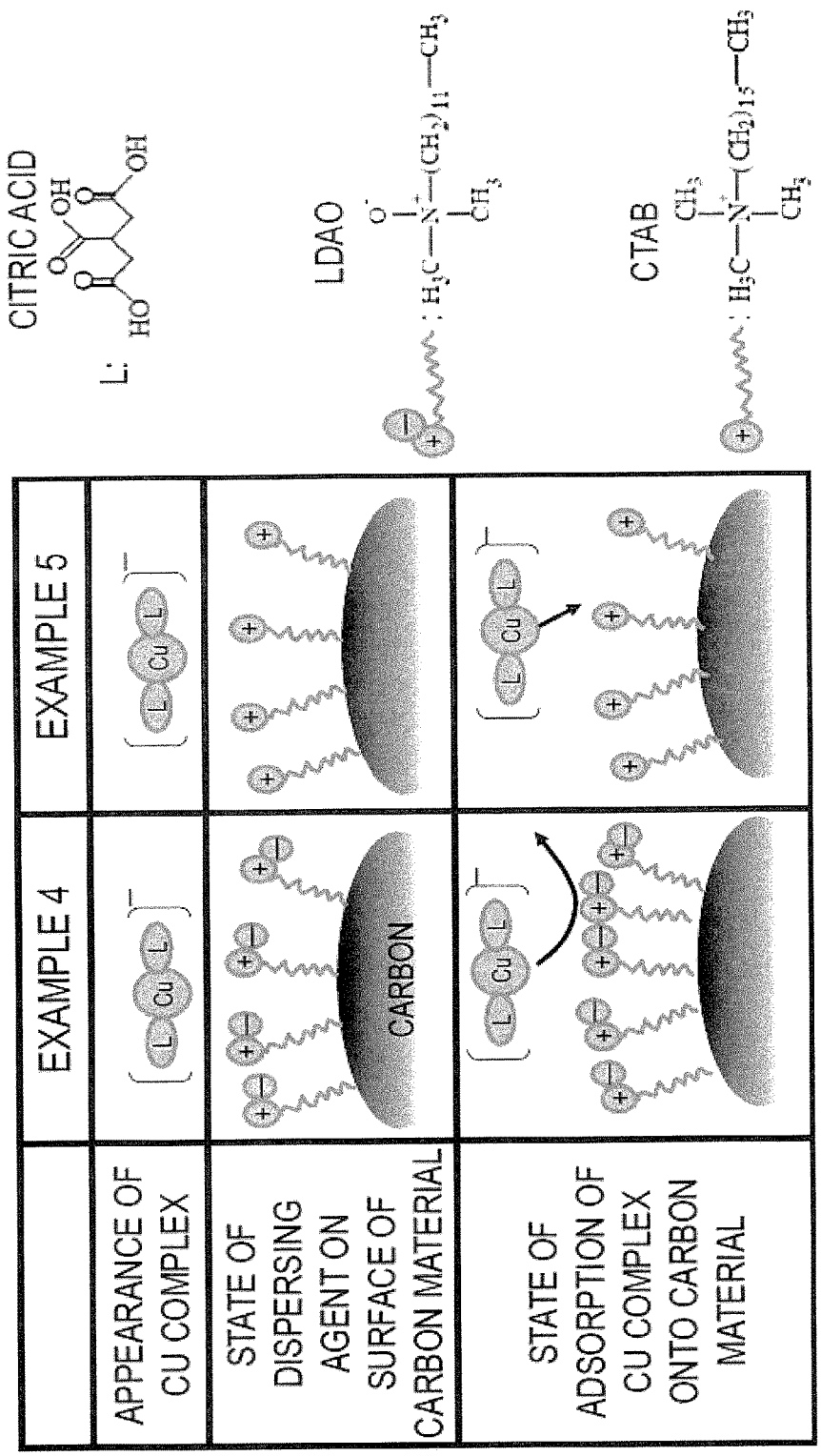

METHOD FOR PRODUCING CORE-SHELL CATALYST

TECHNICAL FIELD

The technical field relates to a method for producing a platinum group metal-supported catalyst having a core-shell structure.

BACKGROUND

Fuel cells including polymer electrolyte fuel cells (PEFCs) have been expected to serve as next-generation power-generation systems. Among others, since PEFCs have advantages of lower operation temperature and compactness compared with other fuel cells, PEFCs have been expected to be used as home and automobile power supplies.

Under these circumstances, with the recent popularization of fuel cells, not only simply superiority of catalysts for polymer electrolyte fuel cells in terms of activity, but also various improvements, in particular, reductions in amounts of platinum group metals used for the catalysts or supported to carriers have increasingly been demanded, and many studies have been conducted to solve the problems.

Among others, as one of conventional arts that has recently attracted a great deal of attention, a technology for reducing the amount of platinum using a catalyst that has a core-shell structure has been known.

Now, the core-shell structure will be described with reference to the cross-section diagrams in FIGS. 1A and 1B. A structure in which a shell metal 2 is formed by use of a precious metal (e.g. platinum) that delivers catalysis performance for fuel cells, on the surface of a core metal 1 that is formed of an inexpensive metal, is called a core-shell structure. Specifically, the core-shell structure refers to a structure in which the shell metal 2 is formed over the entire surface of the core metal 1 as shown in FIG. 1A, or on a part of the surface of the core metal 1 as shown in FIG. 1B.

Details on the conventional arts will be described. For example, a method for synthesizing a catalyst with a core-shell structure using gold that serves as the core metal 1, and platinum that serves as the shell metal 2 can be mentioned. A reducing agent is added to a solution in which a precursor of gold has been dissolved, to synthesize gold nanoparticles. Then, gold nanoparticles are purified through steps such as centrifugal separation and washing. Subsequently, the gold nanoparticles are added to a solution in which a precursor of platinum has been dissolved, to synthesize metal particles that each have an Au—Pt core-shell structure, and the metal particles each having the core-shell structure are purified through steps such as centrifugal separation and washing. By further dispersing the purified metal particles that each have the core-shell structure, and a carbon material in a solution, a catalyst including the metal particles that each have the core-shell structure and that are supported on the carbon material is synthesized (for example, see JP-A-2010-92725).

Furthermore, as another technique, the following method can be mentioned. For example, a palladium salt, and a carbon powder are mixed/stirred, and then, the mixture is subjected to reduction/filtration/washing, thereby obtaining a palladium-supported carbon powder that carries palladium particles. Then, a predetermined voltage is applied to the palladium-supported carbon powder in a copper solution in which a precursor of copper has been dissolved, thereby depositing Cu on the surfaces of palladium particles. Then, the resulting product is subjected to filtration/washing, thereby obtaining a Pd/Cu core-shell carbon powder that carries particles each having a Pd/Cu core-shell structure. Then, the Pd/Cu core-shell carbon powder is soaked in a solution in which a precursor of platinum has been dissolved. This results in dissolution of Cu and deposition of PT due to a relation of an ionization tendency between Pt and Cu. Accordingly, a Pd/Pt core-shell catalyst that carries, on the carbon powder, particles having a Pd/Pt core-shell structure is obtained (for example, see JP-A-2012-157833).

SUMMARY

The catalyst-production method disclosed in JP-A-2010-92725 includes: forming core metal particles that will each configure a core-shell structure; causing a shell metal to deposit on surfaces of the core metal particles to form particles each having a core-shell structure; and supporting on a carbon material the particles each having a core-shell structure. The disclosed method further requires additional steps such as centrifugal separation and washing between the above-mentioned steps. As a result, the method has problems since it requires many steps, is complicated, and increases production costs.

Moreover, there is a concern that supporting the synthesized metal particles on the surface of the carbon material causes biased supporting positions of particles, and this results in aggregation of the particles.

Furthermore, the catalyst-synthesis method disclosed in JP-A-2012-157833 includes: supporting a core metal on a carbon material; causing electro-crystallization of Cu on the surface of the core metal; and replacing the Cu with Pt. Therefore, the disclosed method has a problem of increased production costs in the same manner as the method disclosed in JP-A-2010-92725.

Meanwhile, if, after a core metal salt that serves as the core metal, a shell metal salt that serves as the shell metal, and a carbon material are mixed in the same solution, it is possible to cause the core metal to deposit, followed by deposition of the shell metal, any steps of separation and washing are not required after each of the steps. Therefore, it is expected that it becomes possible to easily produce a core-shell structure without increasing the number of steps.

However, in that case, there would be serious limitations due to materials for the core metal and the shell metal, and thus, the practical realization is difficult. In particular, when Pt is used as the shell metal, Pt is difficult to ionize since it has a low ionization tendency. In other words, Pt is likely to deposit. Accordingly, Pt will deposit before the core metal does, and therefore, it is difficult to realize the above-described core-shell structure.

Hence, the purpose of the disclosure is to control deposition rates of the core metal and the shell metal by easy and simple steps to realize a catalyst having a core-shell structure.

According to an aspect of the disclosure, provided is a method for producing a catalyst, including: (i) mixing a core metal salt that serves as a material for a core metal, and a complexing agent (a) to produce a core metal complex solution containing a core metal complex; (ii) mixing a shell metal salt that serves as a material for a shell metal, and a complexing agent (b) to produce a shell metal complex solution containing a shell metal complex; (iii) mixing a carbon powder and a dispersing agent to produce a carbon powder dispersion; (iv) mixing the core metal complex solution, the shell metal complex solution, and the carbon powder dispersion, and reducing the core metal complex and the shell metal complex on the carbon powder by using at least one reducing agent; and (v) drying and baking at a predetermined temperature the carbon powder resulting from Step (iv), said carbon powder having a core-shell structure that includes the core metal and the shell metal.

In the above method, a complex formed by metal ions that form into the core metal (i.e., corresponding to the core metal complex), a complex formed by metal ions that form into the shell metal (i.e., corresponding to the shell metal complex), and a carbon powder are mixed at the same time or in a stepwise manner. Meanwhile, the core metal complex and the shell metal complex are reduced with at least one reducing agent at a certain point during the process.

With regards to timing for addition of the at least one reducing agent, for example, the following options can be mentioned. That is, after the core metal complex and the carbon powder are mixed, a reducing agent may be added to the resulting mixture to reduce the core metal complex. Subsequently, the shell metal complex may be added to the resulting reaction mixture, and then, a reducing agent may be further added to the reaction mixture to reduce the shell metal complex. Alternatively, after the core metal complex, the carbon powder, and the shell metal complex are mixed together, at least one reducing agent may be added to the resulting mixture to reduce the core metal complex and the shell metal complex.

In some embodiments, Step (iv) includes: (iv-a) mixing the core metal complex solution and the carbon powder dispersion, and then, adding to the resulting mixture a reducing agent (p) that serves as the at least one reducing agent, to reduce the core metal complex on the carbon powder; and (iv-b) adding the shell metal complex solution to the solution resulting from Step (iv-a), and then, adding to the resulting solution a reducing agent (q) that serves as the at least one reducing agent, to reduce the shell metal complex on a surface of the core metal.

In some embodiments, the material of the complexing agent (a) is different from the material of the complexing agent (b).

In some embodiments, an oxidation-reduction potential of the core metal complex is controlled to be larger than an oxidation-reduction potential of the shell metal complex.

In some embodiments, a complex-production constant for the shell metal complex is controlled to be larger than a complex-production constant for the core metal complex.

In some embodiments, the rate of reduction of the core metal complex is controlled to be larger than the rate of reduction of the shell metal complex.

In some embodiments, the material of the complexing agent (a) is different from the material of the dispersing agent.

In some embodiments, materials that cause a charge, positive or negative, of the core metal complex to differ from a charge, positive or negative, of the surface of the carbon powder treated with the dispersing agent are used, such that the core metal complex is adsorbed onto the carbon powder due to electrostatic adsorption.

In some embodiments, the core metal is copper.

In some embodiments, the shell metal is platinum.

According to the disclosure, it becomes possible to synthesize a catalyst having a core-shell structure in an inexpensive manner without raising production costs.

BRIEF DESCRIPTION OF THE DRAWINGS

FIG. 5 is a diagram that shows putative mechanisms for Examples 3 and 5 according to present embodiments.

DESCRIPTION OF EMBODIMENTS

Hereinafter, embodiments of the disclosure will be described with reference to the drawings. In all of the figures, the same symbols are provided to the same or corresponding parts, and overlapping descriptions will be omitted. In addition, although the disclosure will be described in details below, the disclosure is not limited to the descriptions, and can be carried out while modifying the disclosure in various ways within the spirit and scope of the disclosure.

<<Embodiments>>
<Structure of a Fuel Cell>

Figure 1A:
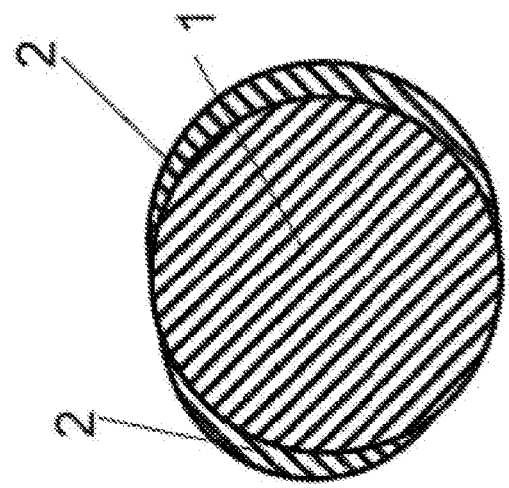
FIGS. 1A and 1B are schematic diagrams that show core-shell structures.
Figure 1B:
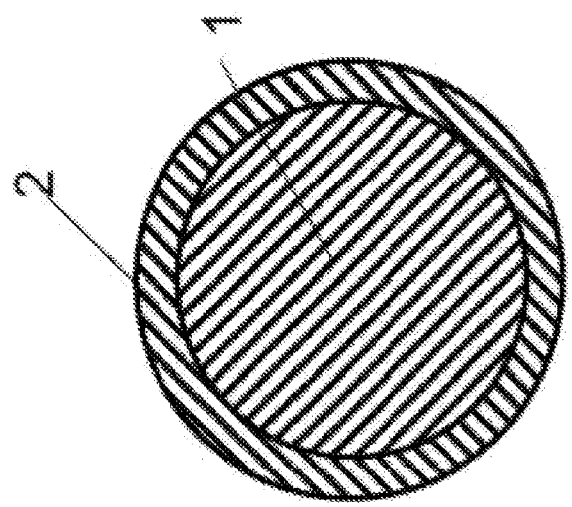
Figure 2:
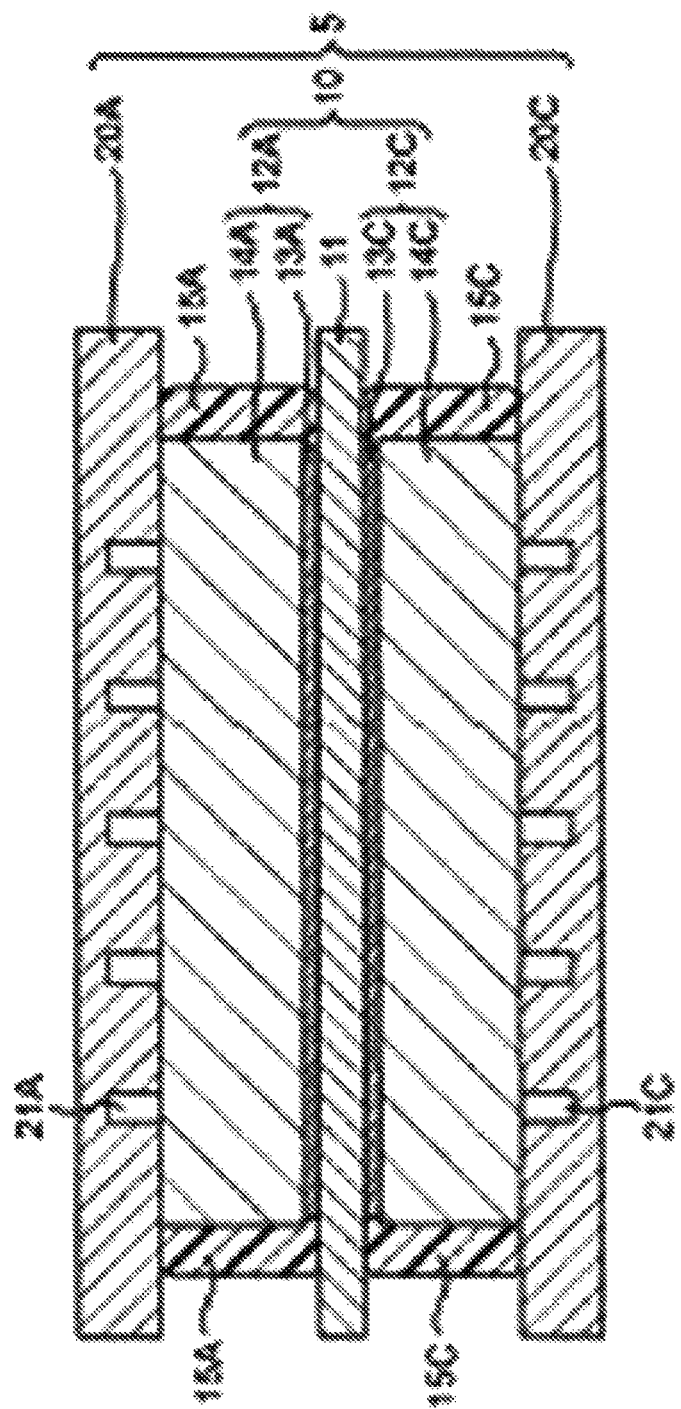
FIG. 2 is a cross-section diagram of a fuel cell according to an embodiment.

FIG. 2 is a cross-section diagram that shows a basic configuration of a fuel cell according to an embodiment. The fuel cell according to the embodiment is a polymer electrolyte fuel cell that causes a fuel gas containing hydrogen and an oxidant gas containing oxygen (e.g. the air) to electrochemically react with each other to generate electrical power and heat at the same time. In addition, the disclosure is not limited to polymer electrolyte fuel cells, and is applicable to various fuel cells.

As shown in FIG. 2, the fuel cell according to the embodiment is provided with a cell (single cell) 5 that includes an MEA 10, and a pair of a tabular anode separator 20A and a tabular cathode separator 20C that are placed on the respective sides of the MEA 10. In addition, fuel cells in some embodiments may be configured by layering multiple cells 5 that each have the above structure. In that case, the layered cells 5 are preferably fastened at a certain fastening pressure by means of a fastening member such as a bolt (not shown in the figure) in order to prevent leakage of the fuel gas and the oxidant gas and to reduce the contact resistance.

The MEA 10 includes: a polymer electrolyte membrane 11 that selectively transports hydrogen ions; and a pair of electrode layers that are formed on the respective sides of the polymer electrolyte membrane 11. One of the pair of the electrode layers is an anode electrode (also called a fuel electrode) 12A, and the other is a cathode electrode (also called an air electrode) 12C.

The anode electrode 12A includes: an anode catalyst layer 13A that is formed on one surface of the polymer electrolyte membrane 11 and that includes as a main ingredient a carbon powder carrying a platinum group metal catalyst; and an anode-gas-diffusion layer 14A that is formed on the anode catalyst layer 13A and that combines current-correction action, gas permeability, and water repellency.

The cathode electrode 12C includes: a cathode catalyst layer 13C that is formed on the other surface of the polymer electrolyte membrane 11 and that includes as a main ingredient a carbon powder carrying a platinum group metal catalyst; and a cathode-gas-diffusion layer 14C that is formed on the cathode catalyst layer 13C and that combines current-correction action, gas permeability, and water repellency.

On a main surface of the anode separator 20A, which is placed at the side where the anode electrode 12A is present, i.e. on the surface coming into contact with the anode-gas-diffusion layer 14A, a fuel-gas passage 21A through which the fuel gas flows is provided.

For example, the fuel-gas passage 21A includes multiple grooves that are approximately parallel to one another. On a main surface of the cathode separator 20C, which is placed at the side where the cathode electrode 12C is present, i.e., on the surface coming into contact with the cathode-gas-diffusion layer 14C, an oxidant-gas passage 21C through which an oxidant gas flows is provided. For example, the oxidant-gas passage 21C includes multiple grooves that are approximately parallel to one another. In addition, the anode separator 20A and the cathode separator 20C may each be provided with a cooling-water flow passage (not shown in the figure) that cooling water passes through. The fuel gas is supplied to the anode electrode 12A through the fuel-gas passage 21A while the oxidant gas is supplied to the cathode electrode 12C through oxidant-gas passage 21C. This causes an electrochemical reaction, and thus, electricity and heat are generated.

Furthermore, although the fuel-gas passage 21A is provided on the anode separator 20A in this embodiment, the disclosure is not particularly limited to such a configuration. For example, the fuel-gas passage 21A may be provided in/on the anode-gas-diffusion layer 14A. In that case, the anode separator 20A may be tabular. In the same manner, although the oxidant-gas passage 21C is provided on the cathode separator 20C in this embodiment, the disclosure is not limited to such a configuration. For example, the oxidant-gas passage 21C may be provided in/on the cathode-gas-diffusion layer 14C. In this case, the cathode separator 20C may be tabular.

An anode separator 15A that serves as a sealing material is placed between the anode separator 20A and the polymer electrolyte membrane 11 in such a manner that the anode separator 15A covers the lateral surfaces of the anode catalyst layer 13A and the anode-gas-diffusion layer 14A, in order to prevent the fuel gas from leaking to the outside. Also, a cathode separator 15C that serves as a sealing material is placed between the cathode separator 20C and the polymer electrolyte membrane 11 in such a manner that the cathode separator 15C covers the lateral surfaces of the cathode catalyst layer 13C and the cathode-gas-diffusion layer 14C, in order to prevent the oxidant gas from leaking to the outside.

Typical thermoplastic resins, thermosetting resins, etc. can be used for the anode separator 15A and the cathode separator 15C. For example, for the anode separator 15A and the cathode separator 15C, silicon resins, epoxy resins, melamine resins, polyurethane-type resins, polyimide-type resins, acrylic resins, ABS resins, polypropylene, liquid crystalline polymers, polyphenylene sulfide resins, polysulfones, glass fiber-reinforced resins, etc. can be used.

Moreover, parts of the anode separator 20A and the cathode separator 20C are preferably penetrate into peripheral parts of the anode-gas-diffusion layer 14A or the cathode-gas-diffusion layer 14C. This makes it possible to improve the power generation durability and the strength.

Furthermore, instead of the anode separator 20A and the cathode separator 20C, a separator may be provided in such a manner that it covers lateral surfaces of the polymer electrolyte membrane 11, the anode catalyst layer 13A, the anode-gas-diffusion layer 14A, the cathode catalyst layer 13C and the cathode-gas-diffusion layer 14C. This configuration makes it possible to suppress deterioration of the polymer electrolyte membrane 11 and to improve handling properties of MEA 10 and workability for the mass production.

<Method for Producing a Core-shell Metal-supported Catalyst>

A core-shell metal-supported catalyst according to the disclosure can be used as a platinum-group-metal catalyst used in the anode electrode 12A and/or the cathode electrode 12C in the above-described structure of the fuel cell.

The method for producing a core-shell metal-supported catalyst according to an embodiment of the disclosure will now be described with reference to FIG. 3.

[1. Method for Producing a Core-shell Metal-supported Catalyst]

In brief, the method for producing a core-shell metal-supported catalyst according to the disclosure (hereinafter, may be referred to as "production method of the disclosure") may include the followings:

(1) A salt of the core metal 1 and a complexing agent are mixed in a solution, and the solution is stirred at predetermined conditions (pH, temperature, time, etc.) to prepare a core metal complex solution in which complexes of the core metal 1 that forms into the part of the core metal 1 in the core-shell structure are produced.

(2) A carbon powder and a dispersing agent are mixed in a solution, and the solution is stirred at predetermined conditions (pH, temperature, time, etc.) to prepare a carbon powder dispersion.

(3) The core metal complex solution and the carbon powder dispersion are mixed, the resulting mixture solution is then stirred at predetermined conditions (pH, temperature, time, etc.), and by bringing the core metal complexes into contact with a reducing agent, the core metal complexes are reduced.

(4) A platinum group metal salt and a complexing agent are mixed into the solution obtained in (3), the mixture solution is stirred at predetermined conditions (pH, temperature, time, etc.) to prepare a platinum group metal complex solution, and the platinum group metal complex solution is further stirred at predetermined conditions (pH, temperature, time, etc.).

(5) By further bringing the solution resulting from (4) into contact with a reducing agent, platinum group metal complexes are reduced to synthesize a core-shell metal-supported catalyst. The core-shell metal supported catalyst carries core-shell metal particles that each include a core metal 1 and a metal layer (shell metal 2) formed on the surface of the core metal 1 and including the platinum group metal. By not bringing the solution into contact with the reducing agent, the core-shell metal-supported catalyst is synthesized due to the difference in the ionization tendency.

Figure 3:
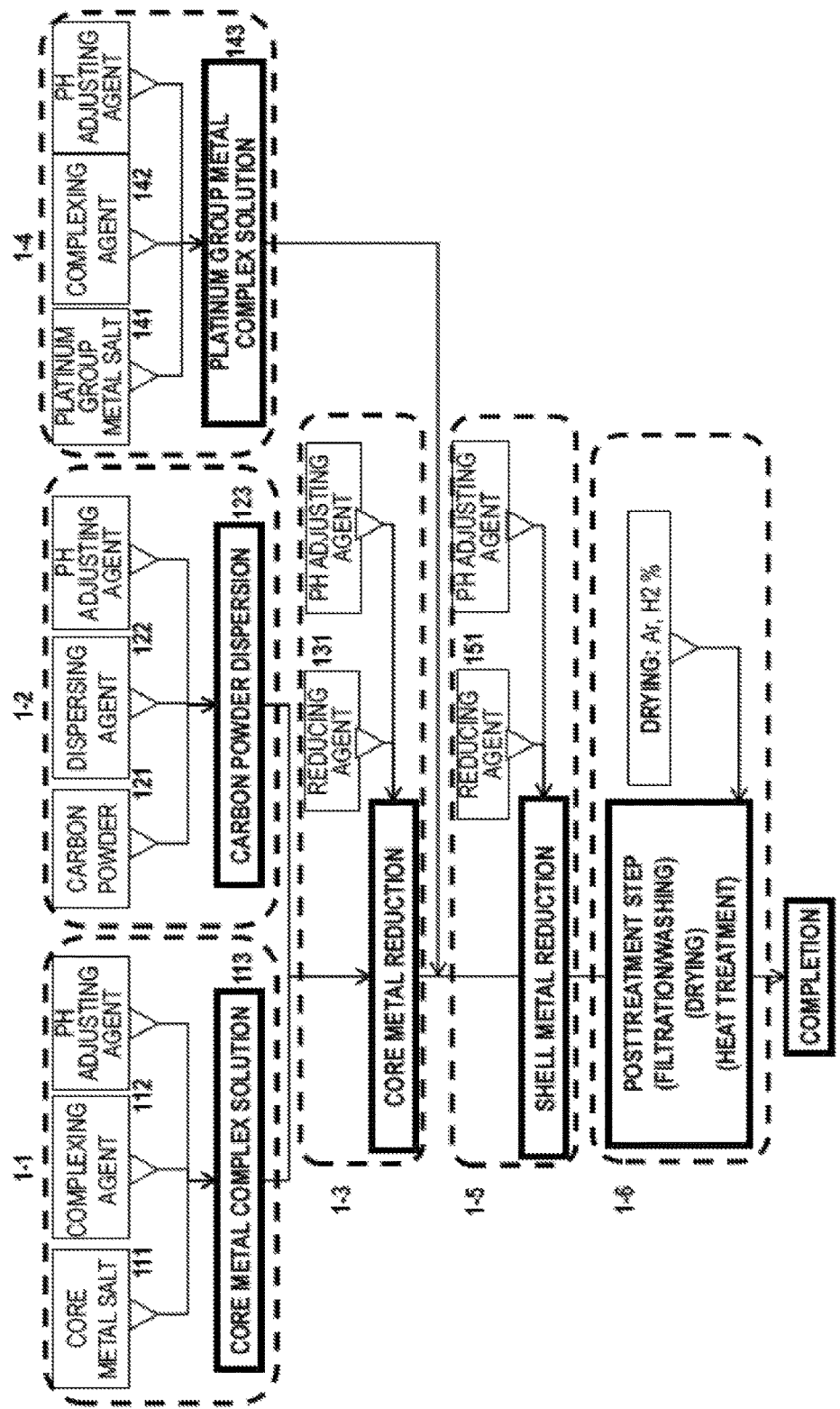
FIG. 3 is a schematic diagram that shows production steps in cases where a platinum-group-metal complex solution is added to a reaction solution after a core metal-reduction reaction in a process for producing a core-shell metal-supported catalyst according to an embodiment.
Figure 4:
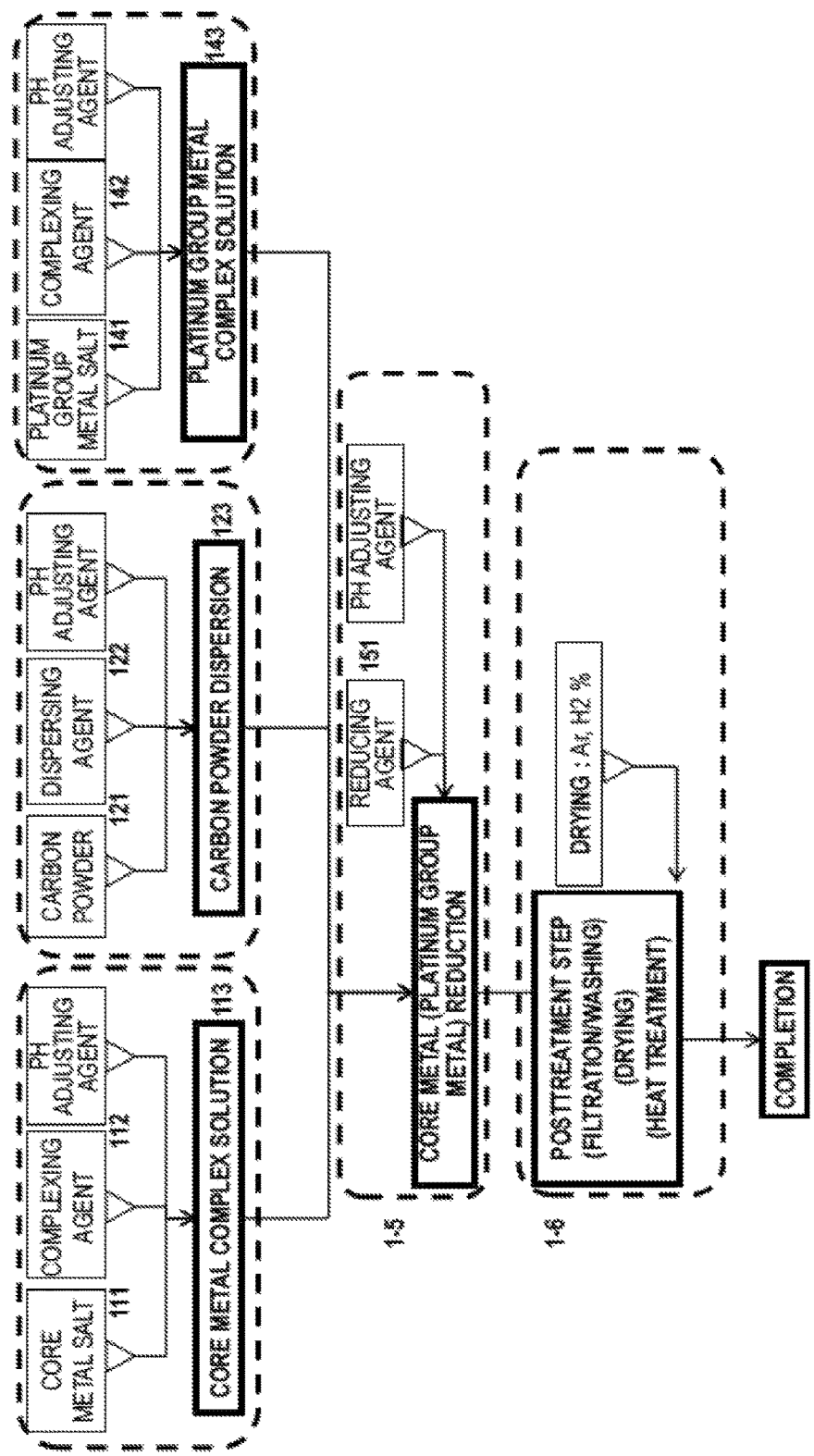
FIG. 4 is a schematic diagram that shows production steps in cases where a core-metal complex solution, a carbon powder dispersion, and a platinum-group-metal complex solution are simultaneously mixed in a process for producing a core-shell metal-supported catalyst according to an embodiment.

Schematic diagrams of steps for production of core-shell metal-supported catalysts in the disclosure are shown in FIGS. 3 and 4. The timing of addition of the platinum-group-metal complex solution in FIG. 3 is different from FIG. 4. The details will be described below.

In addition, the production method of the disclosure is applicable to production of catalysts used in polymer electrolyte fuel cells, and can be expanded to production of cathode-electrode catalysts, anode-electrode catalysts, etc. by way of selecting, as appropriate, types of the core metal salt, the platinum group metal salt, the complexing agent(s)

and the reducing agent(s), and further controlling the pH during the reduction reactions, reduction rates of the metal complexes, the particle diameter of the core-shell metal, the metal-blending ratio, etc.

In order to reduce material costs, it is important to use platinum, which contributes to the catalytic reaction, for the shell metal, and to use an inexpensive metal for the core metal. Therefore, in this embodiment of the disclosure, a method for producing a core-shell metal-supported catalyst in which, as one example of the core-shell metal, copper, which is inexpensive, is used for the core metal while platinum is used for the shell metal will be described.

<Details on the Method for Producing a Core-shell Metal-supported Catalyst>

[1-1. Mixing a Core Metal]

[Core Metal Salt 111]

For a core metal salt 111 (a salt of the core metal 1) used in the production method of the disclosure, copper compounds may be used. As examples of copper compounds, inorganic compounds (e.g. copper oxides, copper nitrates, and copper sulfates), halides (e.g. copper chlorides), organic acid salts (e.g. copper acetates), complex salts (e.g. amine complexes of copper), organic metal compounds (e.g. copper acetolacetonate complexes), etc. can be mentioned.

Alternatively, a copper metal itself may be dissolved in the reaction solution.

For copper salts, among others, copper halides, in particular, copper chlorides are particularly preferably used.

In addition, as for copper salts, one copper salt may be used singularly, or any two or more copper salts may be combined at any ratio.

[Core Metal-complexing Agent 112]

In the production method of the disclosure, the complexing agent 112 is a very important factor.

In the production method of the disclosure, for the complexing agent, an organic compound containing a sulfur atom, and/or a nitrogen atom, and/or an oxygen atom can be used.

As examples of such a complexing agent, organic acids, phosphorous compounds, oximes, amides, amines, alcohols, etc. can be mentioned.

Specific examples of organic acids include the following compounds:

Citric acid ($C_6H_8O_7$); D-2-amino-3-mercapto-3-methylbutanoic acid (penicillamine) ($C_5H_{11}O_2NS$); iminodiacetic acid (IDA) ($C_4H_7O_4N$); N-(cyclohexyl)iminodiacetic acid ($C_{10}H_{17}O_4N$); nitrilotriacetic acid (NTA) ($C_6H_9O_6N$); N-(2-tetrahydro pyranylmethyl)iminodiacetic acid ($C_{10}H_{17}O_5N$); N-(2-hydroxyethyl)ethylenedinitrilo-N,N',N'-triacetic acid (HEDTA) ($C_{10}H_{18}O_7N_2$); ethylenedinitrilotetraacetic acid (EDTA) ($C_{10}H_{16}O_8N_2$); DL-(methylethylene)dinitrilotetraacetic acid) (PDTA) ($C_{11}H_{18}O_8N_2$); trans-1,2-cyclohexylene dinitrilotetraacetic acid (CDTA) ($C_{14}H_{22}O_8N_2$); ethylenebis(oxyethylenenitrilo) tetraacetic acid (EGTA) ($C_{14}H_{24}O_{10}N_2$); diethylenetrinitrilotetraacetic acid (DTPA) ($C_{14}H_{23}O_{10}N_3$); triethylenetetranitrilohexaacetic acid (TTHA) ($C_{18}H_{30}O_{12}N_4$); 6-methlpyridine-2-carboxylic acid ($C_7H_7O_2N$); N-(2-pyridylmethyl)iminodiacetic acid ($C_{10}H_{12}O_4N_2$); a (substituted-thio)acetic acid represented by Formula Z—SCH$_2$CO$_2$H [wherein Z represents a C1-30 alkyl group (e.g. a methyl, ethyl, propyl, butyl, 1-methypropyl, pentyl or hexyl group), a C2-30 alkenyl group (e.g. a prop-2-enyl group, a but-3-enyl group, and a pent-4-enyl group), or a C6-30 aryl group (e.g. a benzyl group)]; lauryldimethylamine N-oxide (LDAO) ($C_{14}H_{31}NO$); DL-mercaptobutanedioic acid (thiomalic acid) ($C_4H_6O_4S$); (ethylenedithio)diacetic acid) ($C_6H_{10}O_4S_2$); oxybis(ethylenethioacetic acid) ($C_8H_{14}O_5S_2$); thiobis(ethylenethioacetic acid) ($C_8H_{14}O_4S_3$); carboxymethylthiobutanedioic acid ($C_6H_8O_6S$); 2,2-bis(hydroxy methyl)-3-mercaptopropanol (monothio pentaerythtitol) ($C_5H_{12}O_3S$); thiosalicylic acid) (TS) ($C_7H_6O_2S$); hexadecyltrimethylammonium bromide ($C_{19}H_{42}BrN$); and diethanolamine (DEA) ($C_4H_{11}O_2N$).

Among others, ethylenedinitrilotetraacetic acid) (EDTA) ($C_{10}H_{16}O_8N_2$); hexadecyltrimethylammonium bromide (CTAB) ($C_{19}H_{42}BrN$); and diethanolamine (DEA) ($C_4H_{11}O_2N$) are more preferable for the complexing agent.

In addition, for the complexing agent, one compound may be used singularly, or any two or more compounds may be combined at any ratio.

[Core Metal Complex Solution 113]

In the production method of the disclosure, a solution obtained by dissolving the core metal salt 111 and the complexing agent 112 in a solvent (hereinafter, referred to as "core metal complex solution 113") is used.

A type of the solvent is not particularly limited. Water and/or organic solvents may typically be used. As examples of organic solvents, alcohols such as methanol and ethanol can be mentioned.

Among others, water is preferable for the solvent because use of water makes it easier to control the pH, and, in particular, distilled water or pure water is preferably used.

In addition, one solvent may be used singularly, or two or more solvents may be combined at any ratio.

Furthermore, the core metal complex solution 113 is preferably adjusted to be alkaline. Specifically, the pH of the reaction solution is typically adjusted to 7 or higher, preferably 8 or higher, more preferably 9 or higher. If the pH of the reaction solution is excessively low, i.e. if the alkalinity is excessively low, core metal complexes may not be stably formed.

[pH Adjusting Agent]

Although a technique for adjusting the pH of the core metal complex solution 113 is not particularly limited, a pH adjusting agent is typically used. Types of the pH adjusting agent are not particularly limited as long as the pH adjusting agent is a compound that does not coordinate with a platinum group metal in the platinum group metal complex, or that has a degree of coordination low enough not to impede formation of core metal complexes by the complexing agent.

As examples of the pH adjusting agent, hydrochloric acid, nitric acid, sulfuric acid, ammonia, potassium hydroxide, sodium hydroxide, etc. can be mentioned. Among others, nitric acid, sodium hydroxide, and hydrochloric acid are preferable.

In addition, for the pH adjusting agent, any one agent may be used singularly, or any two or more agents may be combined at any ratio.

As described above, the core metal salt 111, the complexing agent 112, and a pH adjusting agent are mixed into a solvent to adjust the pH to a predetermined value, and thus, the core metal complex solution 113, in which they are dissolved in the solvent in such a manner that the complexing agent 112 coordinates to the core metal, is obtained.

Additionally, in the production method of the disclosure, it is important to take sufficient enough time to produce a homogeneous core metal complex solution in which the core metal salt and the complexing agent are completely dissolved and any depositions are not found.

As long as the above-mentioned matters are achieved, a method for dissolving and mixing the core metal salt 111, the complexing agent 112, and the pH adjusting agent is not particularly limited. The core metal salt 111, the complexing agent 112, and the pH adjusting agent may be dissolved separately in respective solvents, and then, the solutions may be mixed. Alternatively, the core metal salt, the complexing agent, and/or the pH adjusting agent may be mixed in advance, and the resulting mixture may be dissolved in a solvent.

However, in order to prevent deposition of the solutes in the core metal complex solution 113, it is preferable that the concentrations of the core metal salt 111 and the complexing agent 112 with respect to the solvent, and the temperature and the pH for mixing or dissolving the material are selected as appropriate. That is, the concentrations of the core metal salt, the complexing agent, and the pH adjusting agent in the core metal complex solution are adjusted to be equal to or lower than saturation solubilities of the core metal and the complexing agent. The saturation solubilities vary with types of the core metal salt, the complexing agent and the solvent, the temperature for dissolving the materials, etc. Therefore, the concentrations of the core metal salt and the complexing agent may be selected accordingly.

In general, the concentration of the core metal salt 111 with respect to the core metal complex solution is typically 0.001 wt % or higher, preferably 0.005 wt % or higher, more preferably 0.01 wt % or higher, and is typically 10 wt % or lower, preferably 5 wt % or lower, more preferably 2 wt % or less, in terms of the weight of the core metal.

Additionally, a ratio of amounts of metal atoms in the core metal salt 111 is considered as a ratio of core metal atoms that should be included and that approximately agree with an intended composition of the core metal-supported catalyst.

An actual proportion of the complexing agent 112 to core metal atoms possessed by the core metal salt 111 needs to be equal to or higher than a stoichiometric proportion of the complexing agent 112 that should coordinate with the core metal 111. Specifically, the proportion of the complexing agent 112 that coordinates with the core metal depends on the pH and a complex-production constant, and therefore, needs to be a proportion that makes it possible to realize production of an appropriate complex itself under given conditions (pH, etc.). In a case where the proportion of the complexing agent is excessively high, the concentration of the core metal may consequently be low because of the solubility, and an amount of the core metal that can be supported onto the catalyst by one single operation may be low. Therefore, such a case may be unpreferable from economical point of view. In general, the actual proportion of the complexing agent is typically 1.0-fold or higher, and, typically 10-fold or lower, preferably 5-fold or lower, more preferably 2-fold or lower, particularly preferably 1.5-fold or lower of the stoichiometric proportion.

Additionally, the core metal complex solution 113 may include an additional ingredient(s) besides the above-described core metal salt, complexing agent, and solvent as long as the additional ingredient(s) does or do not impede the reduction reaction described below. As examples of the additional ingredient(s), inexpensive metal salts having metal atoms other than the core metal, etc. can be mentioned. In addition, for the additional ingredient(s), one material may be used singularly, or any two or more materials may be combined at any ratio.

[1-2. Production of a Carbon Powder Dispersion]
[Carbon Powder 121]

For the carbon powder used in the disclosure, a carbon powder 121 having a specific surface area of 250-1200 $m^2/g$ is preferably used.

When the specific surface area is 250 $m^2/g$ or more, an area that the catalyst adheres to can be increased, and therefore, it becomes possible to realize a highly-dispersed state of catalyst particles, thus increasing an active specific surface.

On the other hand, when the specific surface area exceeds 1200 $m^2/g$, a proportion of ultramicroscopic pores (smaller than about 20 Å (200 nm)) into which an ion-exchange resin is difficult to penetrate during formation of electrodes may be high, and thus, utilization efficiency of catalyst particles may be low.

As examples of the carbon powder 121, carbon black, acetylene black, Ketjen black, carbon nanotubes can be mentioned. Additionally, for the carbon powder 121, one material may be used singularly, or two or more materials may be combined at any ratio.

A type of the solvent is not particularly limited. Water and/or an organic solvent are typically used. As examples of the organic solvent, alcohols such as methanol and ethanol can be mentioned.

Among others, water (in particular distilled water) is preferably used as the solvent since it makes it easier to control the pH.

In addition, for the solvent, one material may be used singularly, or two or more materials may be combined at any ratio.

[Production of Carbon Powder Dispersion 123]

In the disclosure, the carbon powder 121 and the solvent can be mixed by a general stirrer or mixer to obtain a carbon powder dispersion 123. In that case, for the purpose of improving affinity of the carbon powder with the solvent, a dispersing agent 122 may be included.

For the dispersing agent 122, a general dispersing agent can be used. However, attention should be paid to not cause any precipitations or aggregations of the core metal complexes and the shell metal complexes when the above core metal complex solution 113 and the above shell metal complex solution are mixed for a reduction reaction of the core metal and the shell metal, which is a subsequent step.

Furthermore, since the above-mentioned core metal complex solution has been adjusted to be alkaline by use of a pH adjusting agent, the carbon powder dispersion 123 is also preferably adjusted to be alkaline in the same manner. Specifically, the pH of the reaction solution is adjusted to typically 7 or higher, preferably 8 or higher, more preferably 9 or higher. If the pH of the reaction solution is excessively low (i.e., if its alkanity is excessive low), complexes may not be able to be formed in a process of mixing the carbon powder dispersion with the platinum group metal complex solution, which is a subsequent step.

Although the technique for adjusting the pH is not particularly limited, a pH adjusting agent is typically used. As examples of the pH adjusting agent, hydrochloric acid, nitric acid, sulfuric acid, ammonia, potassium hydroxide, sodium hydroxide, etc. can be mentioned. Among others, nitric acid, sodium hydroxide, and hydrochloric acid are preferable. In addition, for the pH adjusting agent, any one agent may be used singularly, or any two or more agents may be combined at a predetermined ratio.

[1-3. Step of a Metal-reduction Reaction]

As shown in the scheme in FIG. 3, in the production method of the disclosure, the core metal complex solution 113 and the carbon powder dispersion 123 are mixed, the resulting mixture solution is brought into contact with a reducing agent, the core metal is supported on the carbon powder, the platinum-group-metal complex solution described below is then added to the reaction solution, and the same reducing agent as the reducing agent has been added to the solution, or a different reducing agent is further added to the reaction solution, thereby obtaining a core-shell metal-supported catalyst. This core-shell metal-supported catalyst includes core-shell metal particles that are supported on the surface of the carbon powder and that each have a core-shell structure having a metal layer formed on the surface of the core metal.

Depending on a type of the core metal used herein, it may be possible to obtain a core-shell metal-supported catalyst due to the difference in the ionization tendency even without any reducing agent after the addition of the platinum group metal complex solution to the reaction mixture.

Additionally, as shown in the scheme in FIG. 4, as an alternative to the above-mentioned scheme for the production method of the disclosure, the above-described core metal complex solution 113, carbon powder dispersion 123, and platinum group metal complex solution may be preliminarily mixed, and then, the resulting mixture solution may be brought into contact with a reducing agent to carry out a reduction reaction of the core metal and platinum. In that case, Step 1-3 may be omitted.

[Reducing Agent 131]

A type of the reducing agent used in the production method of the disclosure is not particularly limited as long as it is soluble in a solvent for the core metal complex solution 113, and/or the carbon powder dispersion 123.

As examples of the reducing agent 131, nitrogen compounds such as hydrazine, boron compounds such as sodium borohydride, aldehydes such as formaldehyde, L-ascorbic acid and similar carboxylic acids, alcohols such as methanol, etc. can be mentioned.

Among others, hydrazine, L-ascorbic acid, and sodium borohydride are preferable for the reducing agent.

In addition, for the reducing agent, one material may be used singularly, or any two or more materials may be combined at any ratio.

For an amount of the reducing agent used herein, an amount that makes it possible to sufficiently reduce all molecules of the core metal complex contained in the above core metal complex solution to the core metal is preferable.

In general, one equivalent or more of the reducing agent may typically be sufficient with respect to one equivalent of a metal, and, preferably 1.2 equivalents or more, more preferably 1.5 equivalents or more, even more preferably 2 equivalents or more of the reducing agent is included, in view of efficiency of the reduction reaction. In view of a posttreatment of unreacted materials, etc., the upper limit is typically 500 equivalents or less, preferably 100 equivalents or less, more preferably 40 equivalents or less.

A method for bringing the core metal complex solution 113, the carbon powder dispersion 123, and the reducing agent 131 into contact with one another is not particularly limited. In general, the reducing agent is added to a mixture solution of the core metal complex solution 113 and the carbon powder dispersion 123, and the resulting mixture solution is stirred to carry out a reduction reaction of the core metal.

In addition, although the reducing agent may be added directly to the above mixture solution, and the resulting mixture solution may be mixed, the reducing agent may preliminarily be dissolved in a solvent at a predetermined concentration, and the resulting solution (hereinafter, referred to as a "reducing-agent solution") may be added to the above mixture solution, in order to facilitate mixing and dissolution of the reducing agent into the mixture solution.

In this case, a type of the solvent is not particularly limited as long as it makes it possible to dissolve the reducing agent. In addition, one solvent may be used singularly, or any two or more solvents may be combined at any ratio. However, in general, the same solvent as the solvent used in the core metal complex solution 113 is preferably used. A concentration of the reducing agent in the reducing agent solution, and an amount of the reducing agent solution used herein are also not particularly limited. When the reducing agent solution is added to the core metal complex solution 113, the concentration of the reducing agent or the amount of the reducing agent solution may be adjusted as appropriate such that the amount of the reducing agent with respect to a metal in the core metal complex solution satisfies any of the above-mentioned ranges.

A temperature for the reduction reaction is typically 4° C. or more, preferably 10° C. or more, and/or is typically equivalent to or lower than the boiling point, preferably 95° C. or lower, more preferably 90° C. or lower.

If the temperature for the reduction reaction is excessively high, the reduction reaction proceeds rapidly, and therefore, by-products other than the objective core metal compound may be produced. On the other hand, if the temperature is excessively low, the reduction ability may excessively be low, and therefore, the target core metal compound may not be able to be obtained. In addition, the above-defined temperature ranges (temperature conditions) are referred to as "defined temperature ranges (defined temperature conditions)."

[1-4. Production of Platinum-group-metal Complex Solution]

[Platinum Group Metal Salt 141]

As examples of the platinum group metal salt 141 used in the production method of the disclosure, inorganic compounds (e.g. oxides, nitrates, sulfates of platinum group metals), halides (e.g. chlorides of platinum group metals), organic acid salts (e.g. acetates of platinum group metals), complex salts (e.g. amine complexes of platinum group metals), organic metal compounds (e.g. acetolacetonate complexes of platinum group metals), etc. can be mentioned. In addition, a platinum group metal itself may be dissolved in the reaction solution.

Among others, for the platinum group metal salt, an inorganic compound containing a platinum group metal, a halide of a platinum group metal, or an organic metal compound containing a platinum group metal is preferably used, and, specifically, a chloride of a platinum group metal is particularly preferably used.

In addition, for the platinum group metal, one platinum group metal may be used singularly, or any two or more platinum group metals may be combined at any ratio.

[Complexing Agent 142]

In the production method of the disclosure, the complexing agent 142 is very important factor.

In the production method of the disclosure, as the complexing agent 142, an organic compound containing a sulfur atom and/or a nitrogen atom may be used.

As examples of complexing agents containing a sulfur atom and/or a nitrogen atom, organic acids, phosphorous compounds, oximes, amides, amines, alcohols, etc. can be mentioned.

Specific examples of the organic acids include the following compounds:
D-2-amino-3-mercapto-3-methylbutanoic acid (penicillamine) ($C_5H_{11}O_2NS$); iminodiacetic acid (IDA) ($C_4H_7O_4N$); N-(cyclohexyl)iminodiacetic acid ($C_{10}H_{17}O_4N$); nitrilotriacetic acid (NTA) ($C_6H_9O_6N$); N-(2-tetrahydro pyranylmethyl)iminodiacetic acid ($C_{10}H_{17}O_5N$); N-(2-hydroxyethyl)ethylenedinitrilo-N,N',N'-triacetic acid (HEDTA) ($C_{10}H_{18}O_7N_2$); ethylenedinitrilotetraacetic acid (EDTA) ($C_{10}H_{16}O_8N_2$); DL-(methylethylene)dinitrilotetraacetic acid) (PDTA) ($C_{11}H_{18}O_8N_2$); trans-1,2-cyclohexylene dinitrilotetraacetic acid (CDTA) ($C_{14}H_{22}O_8N_2$); ethylenebis(oxyethylenenitrilo) tetraacetic acid (EGTA) ($C_{14}H_{24}O_{10}N_2$); diethylenetrinitrilotetraacetic acid (DTPA) ($C_{14}H_{23}O_{10}N_3$); triethylenetetranitrilohexaacetic acid (TTHA) ($C_{18}H_{30}O_{12}N_4$); 6-methlpyridine-2-carboxylic acid ($C_7H_7O_2N$); N-(2-pyridylmethyl)iminodiacetic acid ($C_{10}H_{12}O_4N_2$); a (substituted-thio)acetic acid represented by Formula Z—$SCH_2CO_2H$ [wherein Z represents a C1-30 alkyl group (e.g. a methyl, ethyl, propyl, butyl, 1-methypropyl, pentyl or hexyl group), a C2-30 alkenyl group (e.g. a prop-2-enyl group, a but-3-enyl group, and a pent-4-enyl group), or a C6-30 aryl group (e.g. a benzyl group)]; hexadecyltrimethylammonium bromide) (CTAB) ($C_{19}H_{42}BrN$); DL-mercaptobutanedioic acid (thiomalic acid) ($C_4H_6O_4S$); (ethylenedithio)diacetic acid) ($C_6H_{10}O_4S_2$); oxybis(ethylenethioacetic acid) ($C_8H_{14}O_5S_2$); thiobis(ethylenethioacetic acid) ($C_8H_{14}O_4S_3$); carboxymethylthiobutanedioic acid ($C_6H_8O_6S$); 2,2-bis(hydroxymethyl)-3-mercaptopropanol (monothio pentaerythtitol) ($C_5H_{12}O_3S$); thiosalicylic acid) (TS) ($C_7H_6O_2S$); hexadecyltrimethylammonium bromide ($C_{19}H_{42}BrN$); and diethanolamine (DEA) ($C_6O_7H_8N$).

Among others, for the complexing agent, ethylenedinitrilotetraacetic acid (EDTA) ($C_{10}H_{16}O_8N_2$), hexadecyltrimethylammonium bromide (CTAB) ($C_{19}H_{42}BrN$), and diethanolamine (DEA) ($C_6O_7H_8N$) are preferable.

In addition, for the complexing agent, one material may be used singularly, or any two or more materials may be combined at any ratio.

[Platinum-group-metal Complex Solution 143]

In the production method of the disclosure, a solution in which a platinum group metal salt 141, and a complexing agent 142 are dissolved in a solvent (hereinafter, referred to as a "platinum-group-metal complex solution 143") is used.

A type of a solvent used for the solution is not particularly limited. Water or an organic solvent is typically used. As examples of organic solvents, alcohols such as methanol and ethanol can be mentioned.

Among others, water is preferable for the solvent because use of water makes it easier to control the pH, and, in particular, distilled water is preferably used.

In addition, one solvent may be used singularly, or any two or more solvents may be combined at any ratio.

Furthermore, the platinum-group-metal complex solution 143 is preferably adjusted to be alkaline. Specifically, the pH of the reaction solution is adjusted to typically 7 or higher, preferably 8 or higher, more preferably 9 or higher. If the pH of the reaction solution is excessively low (i.e. the alkalinity is excessively low), the platinum-group-metal complex may not be formed.

Although a technique for adjusting the pH of the platinum-group-metal complex solution is not particularly limited, a pH adjusting agent is typically used. Types of the pH adjusting agent are not particularly limited as long as the pH adjusting agent is a compound that does not coordinate with a platinum group metal in the platinum group metal complex, or that has a degree of coordination low enough to not impede formation of the platinum-group-metal complex by the complexing agent.

As examples of the pH adjusting agent, hydrochloric acid, nitric acid, sulfuric acid, ammonia, potassium hydroxide, sodium hydroxide, etc. can be mentioned. Among others, nitric acid, sodium hydroxide, and hydrochloric acid are preferable.

In addition, for the pH adjusting agent, one agent may be used singularly, or any two or more agents may be combined at any ratio.

The platinum group metal salt 141, the complexing agent 142, and the pH adjusting agent are mixed into the solvent, and the pH of the resulting mixture is adjusted to a predetermined value to form a complex of the platinum group metal, thereby obtaining a platinum-group-metal complex solution 143 in a state in which platinum-group-metal complexes with the complexing agents coordinating with platinum group metals exist in a solvent.

In addition, in the method of the disclosure, it is important to take sufficient enough time in order to produce a homogeneous platinum-group-metal complex solution 143 in which the platinum group metal salt 141 and the complexing agent 142 are completely dissolved and any depositions are not found.

As long as the above-mentioned matters can be achieved, a technique for dissolving and mixing the platinum group metal salt 141, the complexing agent 142, and the pH adjusting agent is not particularly limited. The platinum group metal salt 141, the complexing agent 142, and the pH adjusting agent may be dissolved separately in respective solvents, and then, the resulting mixture solutions may be mixed. Alternatively, the platinum group metal salt 141, the complexing agent 142, and the pH adjusting agent may preliminarily be mixed, and then, the resulting mixture may be dissolved into a solvent.

However, in order to prevent depositions in the platinum-group-metal complex solution 143, it is preferable that concentrations of the platinum group metal salt 141 and the complexing agent 142 with respect to the solvent, and the temperature and the pH for mixing or dissolving the materials are selected as appropriate. That is, the concentrations of the platinum group metal salt 141, the complexing agent 142, and the pH adjusting agent in the platinum-group-metal complex solution are each adjusted to be equal to or lower than their saturation solubilities. The saturation solubilities vary with types of platinum group metal salt 141, the complexing agent 142 and the solvent, the temperature for dissolving the materials, etc. Therefore, the concentrations of the platinum group metal salt 141 and the complexing agent 142 may be selected accordingly.

In general, the concentration of the platinum group metal salt 141 in the platinum-group-metal complex solution 143 is typically 0.001 wt % or higher, preferably 0.005 wt % or higher, more preferably 0.01 wt % or higher, and is typically 10 wt % or lower, preferably 5 wt % or lower, more preferably 2 wt % or lower, in terms of a weight of the platinum group metal.

Additionally, a ratio of amounts of metal atoms contained in the platinum group metal salt 141 is considered as a ratio of platinum metal atoms that should be included and that approximately agrees with an intended composition of the platinum-group-metal-supported catalyst.

An actual proportion of the complexing agent to platinum-group-metal atoms possessed by the platinum-group-metal salt 141 may be equal to or higher than a stoichiometric proportion of the complexing agent that should coordinate with the platinum-group-metal. Specifically, a proportion of the complexing agent that coordinates with the core metal depends on the pH and a complex-production constant, and therefore, the actual proportion needs to be a proportion that makes it possible to produce an appropriate complex by itself under given conditions (pH, etc.). If the proportion of the complexing agent is excessively high, the concentration of the platinum-group metal may consequently be low because of the solubility. Therefore, an amount of the platinum-group metal that can be supported onto the material by one single operation may be low, and such a proportion of the complexing agent may be unpreferable from economical point of view. In general, the actual proportion of the complexing agent is typically 1.0-fold or higher, and, typically 10-fold or lower, preferably 5-fold or lower, more preferably 2-fold or lower, particularly preferably 1.5-fold or lower of the stoichiometric proportion.

Additionally, the platinum-group-metal complex solution 143 may include an additional ingredient(s) besides the above-described platinum-group-metal salt 141, complexing agent 142, and the solvent as long as the additional ingredient (s) does not impede the reduction reaction described below. As examples of the additional ingredient(s), metal salts having metal atoms other than platinum-group metals, etc. can be mentioned. In addition, one ingredient may be used singularly, or any two or more ingredients may be combined at any ratio.

In the production method of the disclosure, an important factor for formation of a core-shell metal-supported catalyst having a core-shell structure is reduction of the core metal prior to reduction of the shell metal. The core metal is reduced in that way, and fine particles of the core metal are supported onto the surface of the carbon powder in advance. Next, by causing a platinum-group metal, namely the shell metal, to reduce and simultaneously deposit on the surface of the fine particles of the core metal, a core-shell structure can be formed. That is, the reduction rate of the core metal complex and the reduction rate of the platinum group metal, which is a shell metal complex, need to satisfy the following relationship (Formula 1).

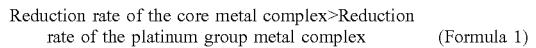

Reduction rate of the core metal complex>Reduction rate of the platinum group metal complex (Formula 1)

That is, the reduction rate of the core metal complex is larger than the reduction rate of the platinum group metal complex.

In order to realize the relationship in the above formula in the disclosure, with regard to a method for controlling the reduction rates, it is effective to select the complexing agent(s), and to determine synthesis conditions such as pH, focusing on the following approaches.

1) Control of an Oxidation-reduction Potential Based on a Complexing Agent

A metal complex has a characteristic that an oxidation-reduction potential of a metal ion varies with a type of a complexing agent that coordinates with the metal ion. In general, the Nerunst equation has been known, and an oxidation-reduction potential E is expressed by Formula (2) in the oxidation-reduction reaction shown by Formula (1).

$$Ox+ne- \Leftrightarrow Red \qquad (1)$$

$$E=E0-(RT/nF)ln([Red]/[Ox]) \qquad (2)$$

Ox: an oxidant
Red: a reductant
E0: a standard oxidation-reduction potential
[Ox]: a concentration of the oxidant
[Red]: a concentration of the reductant That is, by controlling a concentration ratio between the oxidation state and the reduction state in an equilibrium reaction of the oxidant and the reductant, it becomes possible to control the oxidation-reduction potential.

Additionally, an equilibrium in which the oxidant and the complexing agent form a complex is shown by Formula (3).

Additionally, an equilibrium constant (complex-production constant) in Formula (3) is shown by Formula (4).

$$Ox+L \Leftrightarrow OxL \qquad (3)$$

$$K=[OxL]/[Ox][L] \qquad (4)$$

L: a complexing agent
[OxL]: a concentration of the complex
[L]: a concentration of the complexing agent
K: a complex-production constant That is, the concentration of the oxidant Ox varies with the complex-production constant in Formula (4), and, as a result, the oxidation-reduction potential in Formula (2) varies. In other words, in order to control the oxidation-reduction potential, it is important to control the complex-production constant.

Specifically, in order to facilitate the reduction of the core metal prior to the reduction of the platinum group metal, which is the shell metal, it is required that the oxidation-reduction potential of the core metal is increased. Therefore, to increase the oxidation-reduction potential E in Formula (2), the complex-production constant K in Formula (4) is preferably controlled to become smaller.

Hence, the complex-production constant for the core metal and the complex-production constant for the shell metal preferably satisfy the following relationship (Formula 2).

Complex-production constant for the core metal complex<complex-production constant for the shell metal complex (Formula 2)

That is, the complex-production constant for the shell metal complex is larger than the complex-production constant for the core metal complex.

Additionally, in order to realize the above-described relationship, different complexing agents are preferably used for the core metal complex and the shell metal complex. Furthermore, types and mixing concentrations of metals and complexing agents used for the core metal complex and the shell metal complex are preferably selected within a range that satisfies the above relationship, and are not limited by any other matters.

That is, it is preferable that the complexing agent 112 that is mixed with the core metal salt 111, and the complexing agent 142 that is mixed with the platinum salt 141 differ from each other, and the complexing agent 112 and the complexing agent 142 are preferably selected within a range that satisfies the above relationship.

2) Control of the Oxidation-reduction Potential Based on Reaction Conditions

As described above, it is possible to cause the oxidation-reduction reaction of metal complexes to be varied based on control of a complex-production constant. Furthermore, the complex-production constant also varies with reaction conditions for reaction solutions in which the metals and the complexing agents are mixed, e.g. pH. In other words, an optimum pH, an optimum temperature, etc. (hereinafter, referred to as reduction conditions) exist for each metal complex in the reduction step. Therefore, the core metal is preliminarily reduced under reduction conditions in which the core metal is likely to reduce while the platinum group metal is difficult to reduce, and then, the platinum group metal is reduced under readjusted reduction conditions in which the platinum-group metal is likely to reduce. Since such optimum pH conditions vary with types of the core metal, the shell metal, and the complexing agent, the pH conditions need to be adjusted as appropriate.

In other words, it is also possible to set pH conditions such that the pH of the core metal complex solution 113, the pH of the platinum-group-metal complex solution 143, and the pH of the mixture solution of the core metal complex solution 113 and the platinum-group-metal complex solution 143 differ from one another.

Additionally, as examples of the pH adjusting agent, hydrochloric acid, nitric acid, sulfuric acid, ammonia, potassium hydroxide, sodium hydroxide, etc. can be mentioned. Among others, nitric acid, sodium hydroxide, and hydrochloric acid are preferable.

In addition, for the pH adjusting agent, one agent may be used singularly, or any two or more agents may be combined at any ratio.

Procedures for adjusting the pH using an adjusting agent are not particularly limited. It is only required that, before the reduction reaction proceeds, the pH of the reaction solution should be adjusted to any of the above defined ranges (conditions) while a state in which the platinum group metal salt does not precipitate is maintained.

In addition, although adjustment of the pH based on the pH adjusting agent may be carried out at one time, the adjustment may be carried out at two or more times.

[1-5. Step of a Metal-reduction Reaction]

In this step, as shown in the scheme in FIG. 3, the reducing agent 131 is brought into contact with the core metal in the core metal complex solution to reduce the core metal in Step 1-3, the platinum-group-metal complex solution is further added to the resulting mixture solution in Step 1-4, and then, the mixture solution is brought into contact with the reducing agent 151 to reduce platinum, which is the shell metal, thereby obtaining a core-shell metal-supported catalyst. This core-shell metal-supported catalyst includes core-shell metal particles that are supported on the surface of the carbon powder and that each have a core-shell structure having a metal layer formed on the surface of the core metal. In that case, depending on a type of the core metal used herein, it is possible to obtain a core-shell metal-supported catalyst due to the difference in the ionization tendency even without bringing the reaction solution into contact with any reducing agent.

Additionally, in a case where Step 1-3 is not carried out as shown by the scheme in FIG. 4, the core metal complex solution 113, the carbon powder dispersion 123, and the platinum-group-metal complex solution 143 are mixed, and the resulting mixture solution is brought into contact with the reducing agent 151 to obtain the core-shell metal-supported catalyst in which the metal particles each having a core-shell structure is supported on the surface of the carbon powder.

[Reducing Agent 151]

A type of the reducing agent 151 used in the production method of the disclosure is not particularly limited as long as it is soluble in solvents for the platinum-group-metal complex solution 143 and/or the core metal complex solution 113 and the carbon powder dispersion 123.

As examples of the reducing agent 151, nitrogen compounds such as hydrazine, boron compounds such as sodium borohydride, aldehydes such as formaldehyde, L-ascorbic acid and similar carboxylic acids, alcohols such as methanol, etc. can be mentioned.

Among others, hydrazine, L-ascorbic acid, and sodium borohydride are preferable for the reducing agent.

In addition, for the reducing agent, one agent may be used singularly, or any two or more agents may be combined at any ratio.

With regard to an amount of the reducing agent used herein, an amount thereof that makes it possible to sufficiently reduce all platinum group metal complexes contained in the platinum-group-metal complex solution 143 to a platinum group metal is preferable in the production method of FIG. 3. Additionally, in the production method of FIG. 4, an amount of the reducing agent that makes it possible to sufficiently reduce all core metal complexes contained in the core metal complex solution 113, and all platinum-group-metal complexes contained in the platinum-group-metal complex solution 143 to the core metal and the platinum group metal, respectively, is preferable.

In general, one equivalent or more of the reducing agent may typically be sufficient with respect to one equivalent of a metal, and, preferably 1.2 equivalents or more, more preferably 1.5 equivalents or more, even more preferably 2 equivalents or more of the reducing agent may be included, in view of efficiency of the reduction reaction. In view of a posttreatment of unreacted materials, the upper limit is typically 500 equivalents or less, preferably 100 equivalents or less, more preferably 40 equivalents or less.

In addition, in cases where hydrazine is used as a reducing agent, it has been known that the reduction reaction varies with conditions such as a type of the metal salt reduced by the reduction reaction based on hydrazine, and the pH, and therefore, a reduction equivalent of hydrazine cannot be specified in a single uniform way. Hence, in the disclosure, 1 mole of hydrazine is considered as 2 equivalents.

A method for bringing the core metal complex solution 113, the carbon powder dispersion 123, the platinum-group-metal complex solution 143, and the reducing agent 151 into contact with one another is not particularly limited. Typically, the reducing agent 151 may be added to a mixture solution of the core metal complex solution 113, the carbon powder dispersion 123, and the platinum-group-metal complex solution 143, and the resulting mixture solution may be stirred to carry out reduction reactions of the core metal and the platinum group metal.

In addition, although the reducing agent 151 may be added directly to the above mixture solution, and the mixture solution may be mixed, the reducing agent 151 may preliminarily be dissolved in a solvent at a predetermined concentration, and the resulting solution (hereinafter, referred to as a "reducing-agent solution") may be added to the above mixture solution, in order to facilitate mixing and dissolution of the reducing agent into the mixture solution.

In this case, a type of the solvent is not particularly limited as long as it makes it possible to dissolve the reducing agent. In addition, one solvent may be used singularly, or any two or more solvents may be combined at any ratio. However, typically, the same solvent as the solvent used in the core metal complex solution or the platinum-group-metal complex solution is preferably used. A concentration of the reducing agent in the reducing agent solution, and an amount of the reducing agent solution added to the reaction solution are also not particularly limited. The concentration of the reducing agent and the amount of the reducing agent solution may be adjusted as appropriate such that the amount of the reducing agent with respect to metals in the platinum-group-metal complex solution 143 and the core metal complex solution 113 satisfies any of the above-mentioned ranges (conditions).

A temperature for the reduction reaction is typically 4° C. or higher, preferably 10° C. or higher, and is typically equal to or lower than the boiling point of the solvent, preferably 95° C. or lower, more preferably 90° C. or lower.

If the temperature for the reduction reaction is excessively high, the reduction reaction rapidly proceeds. Accordingly, by-products other than the target platinum-group metal compound may be produced. On the other hand, if the temperature is excessively low, the reduction capability may excessively be low, and thus, the target platinum group metal compound may not be able to be obtained.

In addition, the above defined temperature ranges (temperature conditions) are referred to as "defined temperature ranges" (or "defined temperature conditions") in the description below.

[1-6. Posttreatment Step]

In the disclosure, in order to separate the platinum group metal-supported catalyst obtained by the above-described reduction reaction(s), the reaction solution may be subjected to filtration and washing, a drying treatment, and, as needed, posttreatments such as a heat treatment.

A method for separating the resulting platinum group metal-supported catalyst from the reaction solution is not particularly limited. For example, a filtration method using a filter paper or filter cloth, centrifugal separation, sedimentation separation (e.g. decantation), etc. can be mentioned. Among others, in general, a filtration method can be adopted. One separation method may be adopted singularly, or any two or more methods may be combined.

In cases where the separated platinum group metal-supported catalyst is subjected to washing, a solvent used for washing (washing solvent) is not particularly limited as long as it does not react with the platinum group metal-supported catalyst, and does not have any adverse effects on the purpose of the platinum group metal-supported catalyst (use as a catalyst, etc.). However, typically, the same solvent as the solvent used for the above metal complex solution can be mentioned. For the washing solvent, one solvent may be used singularly, or any two or more solvents may be combined at any ratio.

In cases where the separated (or washed) platinum group metal-supported catalyst is dried, a pressure during drying is not particularly limited. Any of ordinary pressure conditions, reduced pressure (or vacuum) conditions, and pressurized conditions can be adopted. However, in general, the drying step may be carried out under approximately ordinary pressure conditions (ordinary pressure conditions, or slightly pressurized or reduced pressure conditions).

As examples of drying methods, static drying based on an oven, etc.; rotary drying based on Kiln, a rotary evaporator, etc.; fixed-bed air flow drying; fluidized bed drying; spray drying based on a spray dryer, etc.; material-transfer drying based on a belt furnace; freeze-drying, etc. can be mentioned. However, any drying method can be adopted.

Selection of a drying method is determined depending on an amount of the product to be treated. However, in any drying methods, the material is preferably dried under the presence of gas flow.

The gas flowed during the drying step is not particularly limited. However, from an economical point of view, typically, the air, a nitrogen gas, or the like can be used. Additionally, in cases in which the platinum group metal-supported catalyst is subjected to a hydrogen treatment, a hydrogen gas may be added to the gas flowed during the drying step.

On the other hand, in cases where the platinum group metal-supported catalyst is used for a certain purpose without carrying out a hydrogen treatment after the drying step, an inert gas is preferably used, and, from an economical point of view, a nitrogen gas is preferable. In addition, one gas may be used singularly, or any two or more gases may be mixed at any ratio. Additionally, in terms of high-speed drying, the material may preferably be dried under superheated-steam-flowing conditions.

A temperature for the drying step is not particularly limited. Either of (i) freeze-drying in which the material is dried at a temperature that is equal to or lower than a melting point of a remaining solvent or washing solvent, (ii) low-temperature drying or ordinary-temperature drying in which the material is dried within a temperature range from a melting point of the remaining solvent or washing solvent to room temperature, and (iii) heat-drying in which a vapor pressure of the remaining solvent or washing solvent is increased at a temperature higher than room temperature can be adopted. However, in general, heat-drying is adopted. In case of heat-drying, the drying temperature is typically within a range from 40° C. to 300° C. In cases where the gas flowed into the drying system is a material other than superheated steam, the material is treated at a temperature equal to or lower than a boiling point of the remaining solvent or washing solvent, in order to prevent radical bumping.

In cases where the dried platinum group metal-supported catalyst is subjected to a heat treatment, as examples of heat-treatment methods, static heating based on an oven, etc.; rotary heating based on Kiln, a rotary evaporator, etc.; fixed-bed heating; fluidized bed heating; and material-transfer heating based on a belt furnace can be mentioned. However, any heating method can be adopted.

A type of the heat treatment may be selected depending on an amount of the material to be treated. However, in any types of heat treatments, the material is preferably heated under the presence of gas flow.

For the gas flowed into the system, a gas not containing oxygen is preferable. Specifically, an inert gas such as nitrogen, argon, and helium, a hydrogen gas can be mentioned. For the gas flowed into the system, one gas may be used singularly, or any two or more gases may be mixed at any ratio. Among others, an argon, nitrogen or hydrogen gas is preferably used singularly, or a mixture of any of these gases is also preferably used.

A lower limit of the temperature for the heat treatment is typically 100° C. or higher, preferably 150° C. or higher, more preferably 200° C. or higher.

An upper limit of the temperature for the heat treatment may typically be equal to or lower than the melting point of the platinum group metal. However, if the temperature is excessively high, the core metal and the platinum group metal will be larger through sintering, and thus, their metal surface areas will be smaller. Consequently, when the resulting platinum group metal-supported catalyst is used, the catalytic activity may be lowered. Therefore, in order to improve the catalytic activity, the upper limit of the temperature for the heat treatment is typically 400° C. or lower, preferably 350° C. or lower, more preferably 300° C. or lower.

EXAMPLES

Examples will be further shown with regards to the method for producing a core-shell metal-supported carbon powder according to present embodiments.

At first, 1 to 50 times the amount of a complexing agent was used to copper chloride that served as the core metal salt 111, and copper that served as the complexing agent 112, in terms of a ratio based on numbers of moles, and nitric acid and sodium hydroxide that served as pH adjusting agents were used. The core metal salt and the complexing agent were dissolved/dispersed in 10-30 wt % ethanol aqueous solution, and the pH was adjusted to 10 by using the pH adjusting agents, thereby forming complexes. The reaction solution was stirred at 30° C. for 1 to 12 hours to prepare a core metal complex solution 113 (Step 1-1).

Next, Ketjen black EC (LION CORPORATION) that served as the carbon powder 121 was dissolved/dispersed in a 10-30 wt % ethanol aqueous solution by using 1 to 50 times the amount of a dispersing agent 122 to the Ketjen black (in terms of weight ratio), and the pH was adjusted as appropriate by using nitric acid and sodium hydroxide that served as pH adjusting agents, to prepare a carbon powder dispersion 123 (Step 1-2). Hereinafter, the Ketjen black is referred to as simply "carbon material."

Next, the core metal complex solution 113 obtained in Step 1-1 and the carbon powder dispersion 123 obtained in Step 1-2 were mixed, and a reducing agent was added to the resulting mixture solution to reduce the copper that served as the core metal, at a predetermined pH (Step 1-3).

Then, platinum hexachloride that served as the platinum group metal salt, and 1 to 50 times the amount of a complexing agent to platinum (in terms of ratio based on numbers of moles) were dissolved/dispersed in a 10-30 wt % ethanol aqueous solution, the pH was adjusted as appropriate by use of nitric acid and sodium hydroxide that served as the pH adjusting agents, and the reaction mixture was stirred at 30° C. for 2 to 24 hours to prepare a platinum-group-metal complex solution (Step 1-4).

In this case, the stirring time is not particularly limited, and can be adjusted as appropriate in accordance with a state of complex formation.

Furthermore, the platinum-group-metal complex solution obtained in Step 1-4 was added to the mixture solution of the core metal complex solution and the carbon powder dispersion obtained in Step 1-3. In advance, NaBH$_4$ that served as a reducing agent was preliminarily dissolved in a 10-30 wt % ethanol aqueous solution, and the pH of the resulting solution was adjusted to a predetermined value by use of nitric acid and sodium hydroxide that served as pH adjusting agents to prepare a reducing agent solution.

Next, the platinum-group-metal complex solution is added to the above-described mixture solution of the core metal complex solution and the carbon powder dispersion (i.e., to the mixture solution obtained in Step 1-3), 1.5 equivalents of the reducing agent to platinum is added to the resulting mixture solution to reduce the platinum-group metal to reduce platinum, and this results in deposition of platinum on the surface of the core metal (Step 1-5). That is, an amount of the reducing agent solution that contained 1.5 equivalents of the reducing agent to the core metal contained in the core metal complex/carbon powder mixture solution was mixed into the core metal/carbon powder/platinum-group-metal complex mixture solution, and the resulting mixture solution was stirred at 30° C. for 1 hour. Consequently, a metal having a core-shell structure was produced, and a dispersion of a carbon powder on the surface of which the core metal was supported was obtained.

It is also possible to add the reducing agent at multiple times as needed.

As Comparative Examples 1-3 and Examples 4-7, catalysts were synthesized based on various combinations of the complexing agent for copper in Step 1-1 above, the dispersing agent for carbon in Step 1-2, the reducing agent (hereinafter, referred to as "reducing agent (A)") in Step 1-3, the complexing agent for platinum in Step 1-4, the reducing agent (hereinafter, referred to as "reducing agent (B)") in Step 1-5, and pH conditions in each of these steps. The combinations and the results are shown in Table 1 and Table 2.

The combinations shown in Table 1 and Table 2 will be described below in detail.

TABLE 1

| | | COMPARATIVE EXAMPLE 1 | COMPARATIVE EXAMPLE 2 | COMPARATIVE EXAMPLE 3 |
|---|---|---|---|---|
| 1-1 | Complexing agents for copper solutions | DEA | DEA | CTAB |
| | pH | 12-13 | 12-13 | 12-13 |
| 1-2 | Dispersing agents for carbon powders | DEA | CTAB | CTAB |
| | pH | 12-13 | 12-13 | 12-13 |
| 1-3 | Reducing agents (A) | NaHB$_4$ | NaHB$_4$ | NaHB$_4$ |
| | pH | 12-13 | 12-13 | 12-13 |
| 1-4 | Complexing agents for platinum solutions | DEA | DEA | CTAB |
| | pH | 12-13 | 12-13 | 12-13 |
| 1-5 | Reducing agents (B) | NaHB$_4$ | NaHB$_4$ | NaHB$_4$ |
| | pH | 12-13 | 12-13 | 12-13 |
| | Formation of Cu complexes | Yes | Yes | No |
| | Dispersiveness of carbon materials | Inferior | Superior | Superior |
| | Degree of adsorption of Cu complexes onto carbon materials | Inferior | Inferior | Inferior |
| | Diameters of metal particles supported onto carbon materials | 400 nm or more | 200 nm or more | 200 nm or more |
| | Carbon materials carrying metal particles having core-shell structures | No | No | No |
| | Comprehensive evaluations | Unacceptable | Unacceptable | Unacceptable |

TABLE 2

| | | EXAMPLE 4 | EXAMPLE 5 | EXAMPLE 6 | EXAMPLE 7 |
|---|---|---|---|---|---|
| 1-1 | Complexing agents for copper solutions | Citric acid | Citric acid | Citric acid | Citric acid |
| | pH | 12-13 | 12-13 | 12-13 | 12-13 |
| 1-2 | Dispersing agents for carbon powders | LDAO | CTAB | CTAB | CTAB |
| | pH | 12-13 | 12-13 | 12-13 | 12-13 |
| 1-3 | Reducing agents (A) | $NaHB_4$ | $NaHB_4$ | — | $NaHB_4$ |
| | pH | 12-13 | 12-13 | 12-13 | 12 |
| 1-4 | Complexing agents for platinum solutions | CTAB | CTAB | CTAB | CTAB |
| | pH | 10 | 12-13 | 12-13 | 10-11 |
| 1-5 | Reducing agents (B) | $NaHB_4$ | $NaHB_4$ | $NaHB_4$ | — |
| | pH | 12-13 | 12-13 | 12-13 | 10 |
| Formation of Cu complexes | | Yes | Yes | Yes | Yes |
| Dispersiveness of carbon materials | | Superior | Superior | Superior | Superior |
| Degree of adsorption of Cu complexes onto carbon materials | | Insufficient | Superior | Superior | Superior |
| Diameters of metal particles supported onto carbon materials | | 20-100 nm | 5-20 nm | 5-20 nm | 5-20 nm |
| Carbon materials carrying metal particles having core-shell structures | | Yes | Yes | Yes | Yes |
| Comprehensive evaluations | | Acceptable | Acceptable | Acceptable | Acceptable |

Comparative Example 1

A catalyst was synthesized based on the following combination: DEA that serves as a complexing agent for copper; DEA that serves as a dispersing agent for a carbon material; $NaBH_4$ that serves as the reducing agent (A); pH conditions of 12 to 13 for Step 1-3; DEA that serves as a complexing agent for platinum; $NaBH_4$ that serves as the reducing agent (B); and pH conditions of 12 to 13 for Step 1-5.

Comparative Example 2

A catalyst was synthesized based on the following combination: DEA that serves as a complexing agent for copper; CTAB that serves as a dispersing agent for a carbon material; $NaBH_4$ that serves as a reducing agent (A); pH conditions of 12 to 13 for Step 1-3; DEA that serves as a complexing agent for platinum; $NaBH_4$ that serves as a reducing agent (B); and pH conditions of 12 to 13 for Step 1-5.

Comparative Example 3

A catalyst was synthesized based on the following combination: CTAB that serves as a complexing agent for copper; CTAB that serves as a dispersing agent for a carbon material; $NaBH_4$ that serves as the reducing agent (A); pH conditions of 12 to 13 for Step 1-3; CTAB that serves as a complexing agent for platinum; $NaBH_4$ that serves as the reducing agent (B); and pH conditions of 12 to 13 for Step 1-5.

Example 4

A catalyst was synthesized based on the following combination: citric acid that serves as a complexing agent for copper; LDAO that serves as a dispersing agent for a carbon material; $NaBH_4$ that serves as the reducing agent (A); pH conditions of 12 to 13 for Step 1-3; CTAB that serves as a complexing agent for platinum; $NaBH_4$ that serves as the reducing agent (B); and pH conditions of 12 to 13 for Step 1-5.

Example 5

A catalyst was synthesized based on the following combination: citric acid that serves as a complexing agent for copper; CTAB that serves as a dispersing agent for a carbon material; $NaBH_4$ that serves as the reducing agent (A); pH conditions of 12 to 13 for Step 1-3; CTAB that serves as a complexing agent for platinum; $NaBH_4$ that serves as the reducing agent (B); and pH conditions of 12 to 13 for Step 1-5.

Example 6

A catalyst was synthesized based on the following combination: citric acid that serves as a complexing agent for copper; CTAB that serves as a dispersing agent for a carbon material; absence of Step 1-3 (reduction step using a reducing agent (A)); CTAB that serves as a complexing agent for platinum; $NaBH_4$ that serves as the reducing agent (B); and pH conditions of 12 to 13 for Step 1-5.

Example 7

A catalyst was synthesized based on the following combination: citric acid that serves as a complexing agent for copper; CTAB that serves as a dispersing agent for a carbon material; $NaBH_4$ that serves as the reducing agent (A); pH conditions of 12 to 13 for Step 1-3; CTAB that serves as a complexing agent for platinum; and absence of Step 1-5 (reduction step using a reducing agent (B)).

<Evaluation Criteria>

As evaluation criteria for the comparative examples and the examples, the presence or absence of formation of Cu complexes, dispersiveness of carbon materials, and the presence or absence of core-shell structures in metal particles were confirmed.

(Formation of Cu Complexes)

With regards to the presence or absence of formation of Cu complexes, when copper chloride and each complexing agent were preliminarily mixed at predetermined pH conditions, based on ultraviolet-visible spectroscopic analyses of the resulting solutions, it was confirmed whether changes in photoabsorption spectra due to formation of complexes were present. When changes in the photoabsorption spectra were observed, it was determined that formation of complexes was present ("yes" in Table 2). When no changes in the photoabsorption spectra were observed, it was determined that formation of complexes was not present ("no" in Table 1).

(Dispersiveness of Carbon Materials)

With regards to dispersiveness of carbon materials, the carbon material and each dispersing agents were dispersed into a solution, and the solution was allowed to stand for 6 hours or more, and then, it was confirmed whether or not any precipitations were caused. With respect to a sample in which any precipitations were not caused, the sample was considered to exhibit superior dispersiveness ("superior" in Table 1 and Table 2). With respect to a sample in which precipitations were caused, the sample was considered to exhibit inferior dispersiveness ("inferior" in Table 1 and Table 2).

(Degrees of Adsorption of Cu Complexes onto Carbon Materials)

Next, each Cu complex solution and each carbon dispersion were mixed, and the resulting mixture was stirred for a predetermined time. Then, an amount of Cu ions in the solution was analyzed based on ICP emission spectrometry. With regards to the obtained results, if 80% or more of Cu complexes to amounts of all Cu ions were absorbed onto carbon materials, the samples were considered to exhibit excellent adsorption ("superior" in Table 1 and Table 2). If 80-20% of Cu complexes were adsorbed onto a carbon material, it was considered that the adsorption amount was insufficient ("insufficient" in Table 2). If less than 20% of Cu complexes were adsorbed onto carbon, it was considered that degrees of adsorption states were inferior ("inferior").

(Diameters of Metal Particles Supported onto Carbon Materials)

Furthermore, diameters of metal particles supported onto carbon materials were calculated based on STE image analyses. Although details on determination of sizes of metal particles will be described in the section of discussion below, sufficient surface areas of particles can be secured if the sizes of metal particles are as small as possible, and, consequently, the resulting catalysts likely fulfill functions required for fuel cells. To the contrary, if the diameters of the particles are excessively large, the surface areas of the particles will be smaller, and thus, the resulting catalysts hardly fulfil functions required for fuel cells. Furthermore, in that case, since the particles may have a diameter that is equal to the size of the carbon material itself, the particles may hardly be supported onto the carbon material, or may be eliminated from the carbon material. Therefore, it is considered that it would be difficult to apply particles having a diameter on the scale of several hundred nanometers to catalysts for fuel cells. For these reasons, it was determined that samples exhibiting particle diameters of 100 nm or less can be used as catalysts for fuel cells.

In addition, the above-described evaluation criteria or thresholds are not particularly limited, and can be modified depending on designs of fuel cells and/or intended purposes.

(Confirmation of Metal Particle-supported Carbon Materials)

With regards to metal particles supported on carbon materials in produced metal particle-supported carbon materials, it was confirmed whether or not the metal particles had a core-shell structure, based on the STEM/EDS analyses. When it was confirmed that metal particles were supported on carbon materials, and that Cu metals are present inside the metal particles, while Pt is present in surfaces of the metal particles, it was determined that carbon materials carrying metal particles were produced. Those samples are shown as "Yes" in Table 1 and Table 2.

(Comprehensive Evaluation)

Furthermore, for comprehensive evaluations, samples usable as catalysts for fuel cells were determined as acceptable. Specifically, samples in which metal particles were supported onto carbon materials in a highly dispersed manner, diameters of the metal particles were 100 nm or less, and the supported metal particles had core-shell structures were considered as acceptable. Other samples were considered as unacceptable.

<Discussion>

Discussion will be provided below on the results.

First of all, Comparative Examples 1-3 will be discussed. The catalysts were synthesized under conditions where the carbon material was not dispersed in COMPARATIVE EXAMPLE 1, under conditions where Cu complexes were not adsorbed onto the carbon material in COMPARATIVE EXAMPLE 2, and under conditions where Cu complexes were not formed in COMPARATIVE EXAMPLE 3. As a result, any carbon materials carrying metal particles with core-shell structures could not be synthesized in any of these comparative examples. It was presumed that because the carbon material was not sufficiently dispersed, because Cu complexes were not adsorbed onto the carbon material, or because, after Cu complexes were adsorbed homogenously onto the surface of carbon, the Cu complexes were not reduced.

For more details, it is considered as follows. That is, Cu complexes that were not adsorbed and immobilized onto the carbon material moved freely in the solution. Therefore, other Cu complexes concentrated on Cu metal particles that had been produced by the reduction and that served as nuclei, the particles grew large so as to have large particle diameters, and thus, metal particles having large particle diameters were produced. In that case, if metal particles are excessively large, i.e. having diameters of several hundred nanometers while carbon materials have a particle diameter of several ten to hundred nanometers, the metal particles will not be supported onto the carbon materials, and it comes into a state in which the metal particles and the carbon materials are simply mixed. Consequently, it becomes difficult to obtain efficient power generation properties as catalysts for fuel cells.

From the above results, stable dispersion of carbon materials, and adsorption of Cu complexes onto carbon materials are essential for obtaining carbon materials that carry metal particles having core-shell structures and that can be used as catalysts for fuel cells.

Next, EXAMPLE 4, which was designed as a solution to problems in Comparative Examples 1-3 and for which complexing agents and dispersing agents were intensively studied, will now be discussed. In contrast to Comparative Examples 1-3, in EXAMPLE 4, a shape in which metal particles having a particle diameter of 30-80 nm and a core-shell structure were supported on the carbon material was obtained by carrying out the synthesis based on the complexing agent/dispersing agent combination that realizes formation of complexes with Cu and adsorption onto the carbon material. It is considered that Cu complexes were adsorbed onto the carbon material, the adsorbed Cu complexes formed nuclei of metal particles on the carbon material, and Cu complexes that were not adsorbed gathered at the nuclei, thereby growing into metal particles.

Furthermore, EXAMPLE 5, for which further improvements to EXAMPLE 4 were considered, will be described. A combination of a complexing agent and a dispersing agent, and conditions such as the pH and the reaction time that further improve a rate of adsorption of formed Cu complexes onto the carbon material in comparison with EXAMPLE 4 were adjusted. As a result, metal particles having a particle diameter smaller than EXAMPLE 4 could be synthesized. It is considered that the amount of Cu complexes that were adsorbed onto the carbon material increased, and, consequently, the number of nuclei of Cu metal particles formed on carbon material increased, thus forming highly-dispersed metal particles having a smaller particle diameter. Reasons for the presence of differences between Examples 4 and 5 will now be discussed with reference to FIG. 5. FIG. 5 shows Cu complexes, states of dispersing agents on surfaces of carbon materials, and states of adsorption of Cu complexes onto the carbon materials. EXAMPLE 5 is considered as follows. Cu and citric acid (shown as "L" in the figure) form a Cu complex, the Cu complex charges negatively as a whole. Additionally, CTAB that serves as a dispersing agent is adsorbed onto the surface of the carbon through a hydrocarbon moiety that is a hydrophobic group possessed by CTAB, and the nitrogen atoms face outward. Furthermore, nitrogen atoms charge positively. Therefore, Cu complexes were able to easily adsorb onto the surface of the carbon material. In contrast, EXAMPLE 4 is considered as follows. With regard to LDAO that serves as a dispersing agent for the carbon material, nitrogen atoms having positive charges, and oxygen atoms having negative charges face outward on the carbon material, and, due to the presence of positive and negative charges, it becomes more difficult for Cu complexes to adsorb onto the carbon material, as compared with EXAMPLE 5. For these reasons, the diameter of particles became larger.

Next, EXAMPLE 6 and EXAMPLE 7 refer to results of cases in which timing of addition of reducing agents, and conditions such as pH were modified with respect to EXAMPLE 5. As a result, in the same manner as EXAMPLE 5, carbon materials that carried metal particles having core-shell structures could be obtained. As revealed by these examples, for timing for addition of reducing agents, it is not necessarily required that reducing agents are added twice, i.e., once in the first reduction step after the copper solution and the carbon powder solution are mixed, and once in the second reduction step after the platinum solution is further mixed into the reaction solution. It is also possible to omit the first reduction step for copper complexes, or the second reduction step for the platinum complexes. Additionally, it is also possible to adjust deposition rates of copper and platinum by varying the pH conditions in the first reduction step and the second reduction step.

From the above examples, it was demonstrated that carbon materials (core-shell catalyst) that carry metal particles having core-shell structures can be synthesized from solutions in which Cu complexes, carbon materials, and platinum complexes coexist.

Although purposes of a method for producing a catalyst having a core-shell structure according to the disclosure are not particularly limited, for example, the method is applicable to production of catalysts for electrodes in fuel cells, in particular, solid polymer fuel cells.

What is claimed is:

1. A method for producing a catalyst, comprising:
   (i) mixing a core metal salt that serves as a material for a core metal, and a complexing agent (a) to produce a core metal complex solution containing a core metal complex;
   (ii) mixing a shell metal salt that serves as a material for a shell metal, and a complexing agent (b) to produce a shell metal complex solution containing a shell metal complex;
   (iii) mixing a carbon powder and a dispersing agent to produce a carbon powder dispersion;
   (iv) mixing the core metal complex solution, the shell metal complex solution, and the carbon powder dispersion simultaneously, and reducing the core metal complex on the carbon powder, next, the shell metal complex on the core metal complex by using at least one reducing agent and by using that the rate of reduction of the core metal complex is larger than that of the shell metal complex; and
   (v) drying and baking at a predetermined temperature the carbon powder resulting from Step (iv), said carbon powder having a core-shell structure that comprises the core metal and the shell metal,
   wherein the dispersing agent is the same as the complexing agent (b) and both dispersing agent and the complexing agent (b) are hexadecyltrimethylammonium bromide (CTAB),
   wherein the complexing agent (b) is different from the complexing agent (a),
   wherein a combination of the material of the complexing agent (a), the material of the complexing agent (b) and a material of the dispersing agent, cause a charge, positive or negative, of the core metal complex to differ from a charge, positive or negative, of the surface of the carbon powder treated with the dispersing agent, such that the core metal complex is adsorbed onto the carbon powder due to electrostatic adsorption.

2. The method for producing a catalyst according to claim 1, wherein an oxidation-reduction potential of the core metal complex is controlled so as to be larger than an oxidation-reduction potential of the shell metal complex.

3. The method for producing a catalyst according to claim 1, wherein a complex-production constant for the shell metal complex is controlled so as to be larger than a complex-production constant for the core metal complex.

4. The method for producing a catalyst according to claim 1, wherein the core metal is copper.

5. The method for producing a catalyst according to claim 1, wherein the shell metal is platinum.

6. The method of producing a catalyst according to claim 1, wherein in Step (iv), a reduction rate of the core metal complex is larger than a reduction rate of the platinum group metal complex by the condition of pH.

7. The method for producing a catalyst according to claim 1, wherein in Step (iv), a reduction rate of the core metal complex is larger than a reduction rate of the platinum group metal complex by selecting the complexing agents.

* * * * *